United States Patent [19]
Facciano et al.

[11] Patent Number: 5,318,255
[45] Date of Patent: Jun. 7, 1994

[54] STAGE SEPARATION MECHANISM FOR SPACE VEHICLES

[75] Inventors: Andrew B. Facciano, Oro Valley, Ariz.; Rudolph A. Eisentraut, Tucson, Ariz.; Stephen D. Haight, Tucson, Ariz.; Ryan D. Lamberton, Tucson, Ariz.; John D. Smith, Tucson, Ariz.

[73] Assignee: Hughes Aircraft Company, Los Angeles, Calif.

[21] Appl. No.: 902,270

[22] Filed: Jun. 22, 1992

[51] Int. Cl.⁵ .................................. B64G 1/64
[52] U.S. Cl. ........................ 244/158 R; 102/378
[58] Field of Search ............... 244/158 R, 161, 172; 102/377, 378

[56] References Cited

U.S. PATENT DOCUMENTS

| | | | |
|---|---|---|---|
| 3,116,895 | 1/1964 | Mitchum, Jr. | 244/158 R |
| 3,122,098 | 2/1964 | Glennan | 102/378 |
| 3,174,706 | 3/1965 | Wagner | 244/158 R |
| 3,352,192 | 11/1967 | Webb | 102/378 |
| 3,420,470 | 1/1969 | Meyer | 244/158 R |
| 4,715,565 | 12/1987 | Wittmann | 244/158 R |
| 5,108,049 | 4/1992 | Zinovi | 244/158 R |

Primary Examiner—Michael S. Huppert
Assistant Examiner—Anne E. Bidwell

[57] ABSTRACT

A mechanism locking and controllably releasing two space vehicles along a preselected separation axis. The mechanism including a mechanical lock/release and a spring separation device that controllably forces the two space vehicles apart. An electrical interconnect maintains electrical communication between the two space vehicles when locked together. The two space vehicles can be reliably separated by activating a single disengagement actuator.

14 Claims, 4 Drawing Sheets

STAGE SEPARATION MECHANISM FOR SPACE VEHICLES

BACKGROUND OF THE INVENTION

This invention relates to a separation mechanism for small space vehicles, and, more particularly, to such a mechanism that operates from a single disengagement actuator device.

Space vehicles are often constructed as a launcher or booster stage that provides the primary propulsion, and a payload in a second stage that is carried by the launcher/booster. The two stages are mechanically and electrically joined together while the launcher/booster operates, and separated after the launcher/booster is no longer needed. This approach is used in a wide variety of types of space vehicle situations.

In an example, in one concept of a space defense system a small space vehicle payload is carried on the forward end of a booster that provides primary propulsion. The booster has a primary axial thruster and the required propulsion tanks. The small space vehicle has a sensor that seeks a target. When a target is detected, the booster thruster is fired to accelerate the combined vehicle toward the target. When the booster is no longer needed, the small space vehicle is separated from the booster and travels toward the target. The small space vehicle has guidance thrusters that permit it to change its trajectory to intercept the target, and these guidance thrusters are more effective for the reduced mass and inertia of the small space vehicle as compared with the combined small space vehicle and booster. After separation, the small space vehicle changes course as necessary to impact the target.

A clean separation of the small space vehicle from the booster is critical to the success of the system. Care is required so that the trajectory of the small space vehicle is not significantly altered by the act of separation, with the result that the sensor of the small space vehicle would lose alignment with the target either permanently or temporarily so that an expenditure of the limited fuel of the small space vehicle would be expended to place the small space vehicle back on course to the target. The separation must also be clean in the sense that the small space vehicle and its sensor are not damaged during the separation, as by debris or gases that are emitted from either of the stages during the separation.

Existing and proposed separation mechanisms have suffered shortcomings in some of these areas, and may also have insufficient reliability. Various steps of vehicle separation are typically accomplished by the firing of pyrotechnic devices or other actuators in a precisely defined order. Thus, for example, in one approach several mechanical linkages and the electrical connections between the stages are severed by the firing of a number of pyrotechnic devices. Another pyrotechnic device is fired to push the two stages apart. Thus, multiple pyrotechnic devices are utilized, and these multiple devices must be fired at a precisely defined time relative to the firing of the other devices or the separation will not be fully successful. Moreover, each pyrotechnic or other type of actuator device has a probability of successful operation upon command, its reliability, that is less than 1.0. Consequently, the more pyrotechnic devices that must be operated, the lower is the overall reliability of the separation mechanism. Each pyrotechnic device creates a structural dynamic shock and acoustic load upon activation. The more pyrotechnic devices that are used, the more shocks and loadings of the structure from this source.

There is a need for an improved approach to achieving separation of small space vehicles that does not significantly alter the trajectory of the vehicle of interest, optimizes system weight, has low joint compliance to minimize structural dynamic motion, does not cause damage in any manner to the vehicle, and is highly reliable. The present invention fulfills this need, and further provides related advantages.

SUMMARY OF THE INVENTION

The present invention provides a separation mechanism that reliably separates two space vehicle stages. The separation is achieved smoothly so that there are no significant components of motion other than the desired linear movement along a preselected separation axis. The separation cannot damage the vehicles, as there are no structural pieces floating with the space vehicles after separation, nor are there any gas or debris ejected during separation that could contaminate or impinge upon sensor windows. The separation apparatus simultaneously maximizes joint stiffness between the two space vehicle stages and minimizes resultant structural dynamic motion for the overall space vehicle during booster ignition and shut-down. The approach of the invention minimizes weight and therefore launch expense of the space vehicles.

In accordance with the invention, a mechanism locks a first-stage space vehicle and a second-stage space vehicle together, and controllably releases and separates the two vehicles along a preselected separation axis. The mechanism comprises lock/release means for mechanically locking together and controllably releasing a first-stage space vehicle and a second-stage space vehicle. There is electrical interconnect means for maintaining electrical communication between the first-stage space vehicle and the second-stage space vehicle when the two space vehicles are locked together, and for controllably disconnecting the electrical communication when the two space vehicles are controllably released. The mechanism further includes separator means for mechanically forcing the two space vehicles apart along a preselected separation axis and guide means for mechanically guiding the two space vehicles as they separate, so that they separate along the separation axis while resisting other linear and rotational components of motion. In a preferred approach, the lock/release means is operated by the firing of a single disengagement actuator device such as a pyrotechnic, in turn causing the separation of the electrical interconnect and the activation of the separator means for mechanically forcing the two space vehicles apart.

Preferably, the lock/release means includes a first circumferentially extending flange on the first-stage space vehicle and a second circumferentially extending flange on the second-stage space vehicle. A circumferential clamp such as a V-band clamp captures the first and second circumferentially extending flanges therein, the circumferential clamp having two facing but separated ends. An optional clamp spring in compression extends between the facing but separated ends of the circumferential clamp to force the separated ends apart. The circumferential clamp may itself provide sufficient radial spring movement to negate the necessity of the clamp spring. A disengagement actuator device extends between the separated ends and is operated to initiate separation.

In the preferred approach, the electrical interconnect means includes a first electrical interconnect on the first-stage space vehicle and a second electrical interconnect on the second-stage space vehicle. The first and second electrical interconnects are in facing relationship along a radial axis perpendicular to a preselected separation axis. There is also means for causing the first and second electrical interconnects to separate along the radial axis upon operation of the lock/release means.

The separator means for mechanically forcing the two space vehicles apart includes resilient separation means, such as a spring, compressed between the first-stage space vehicle and the second-stage space vehicle when the lock/release means locks the two space vehicles together. The separation means is released to force the two space vehicles apart along the separation axis when the lock/release means is operated to mechanically release the two spacecraft.

Preferably, the guide means for mechanically guiding the two space vehicles as they separate includes at least three noncollinear pairs of guides and guide receptors. One member of each pair is on the first-stage space vehicle and the other member of each pair is on the second-stage space vehicle. Each guide and guide receptor extend parallel to the preselected separation axis to ensure that the space vehicles separate along that axis without binding or suffering any mechanical hindrance, and with no other components of movement imparted during separation.

The presently preferred embodiment of the invention is utilized to separate the small space vehicle (in this case sometimes termed a "kinetic vehicle") from the booster of a space interceptor vehicle. With the two space vehicles locked together to form a stiff structural joint, the booster is fired to accelerate the vehicles to a maximum velocity. The separation is initiated by the operation of a single disengagement actuator, releasing the lock/release means to achieve mechanical separation of the space vehicles. The electrical interconnect is disconnected by the radial movement associated with the operation of the lock/release means. Once its restraint is released, the spring of the separator means extends to mechanically force the small space vehicle away from the booster, so that the small space vehicle can be maneuvered with its guidance thrusters as it travels along its trajectory toward the target. The separation occurs without imparting rotational or tipping motion to the small space vehicle.

In this design, the guide means performs the important function of preventing the imparting of components of motion to the small space vehicle other than that along the separation axis. Although the small space vehicle may later be guided to other directions, initially the booster and small space vehicle are pointed at the target or intercept point so that the separation should be along this preselected direction. If any other component of motion were present, the sensor might lose alignment, and it would be necessary to use some of the limited amount of small space vehicle fuel to re-acquire the target and restore the small space vehicle to the preselected separation direction.

The locking and separation mechanism of the invention provides an important advance in the art of space vehicle systems. Two space vehicles can be reliably separated by activating a single disengagement actuator device, which in turn accomplishes mechanical and electrical disconnection and also causes the separator spring to function. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
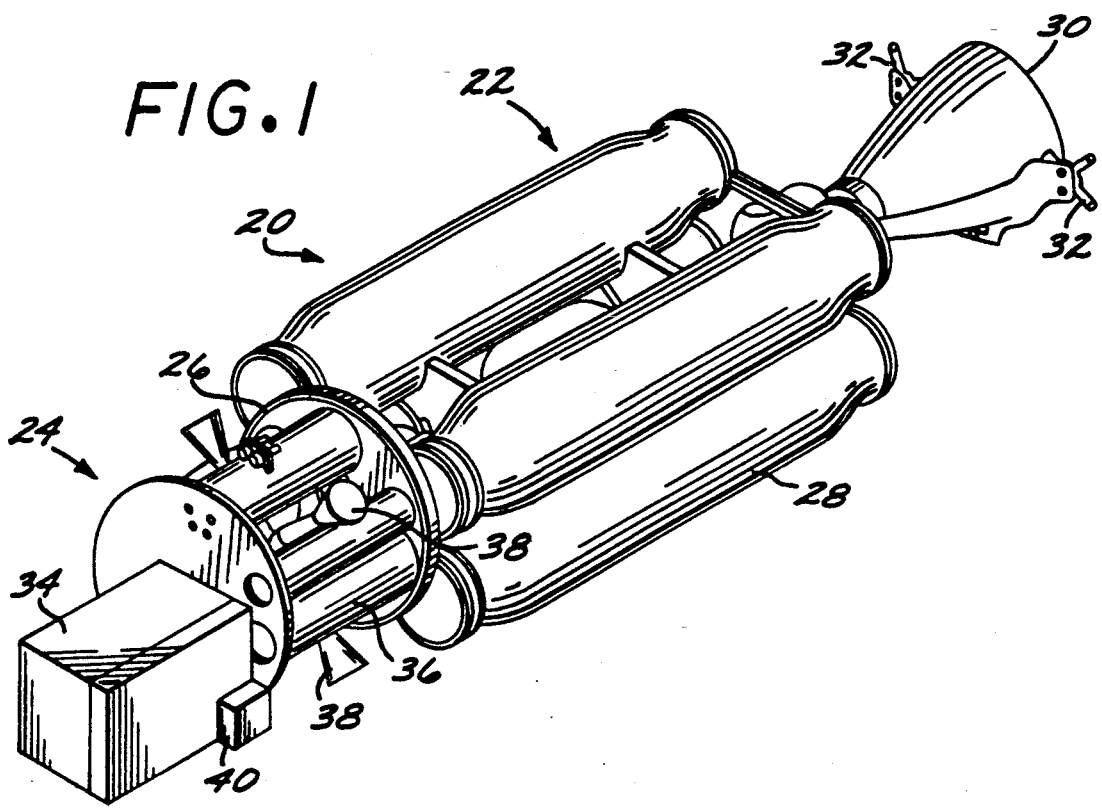
FIG. 1 is a perspective view of two space vehicles locked together prior to separation.
Figure 2:
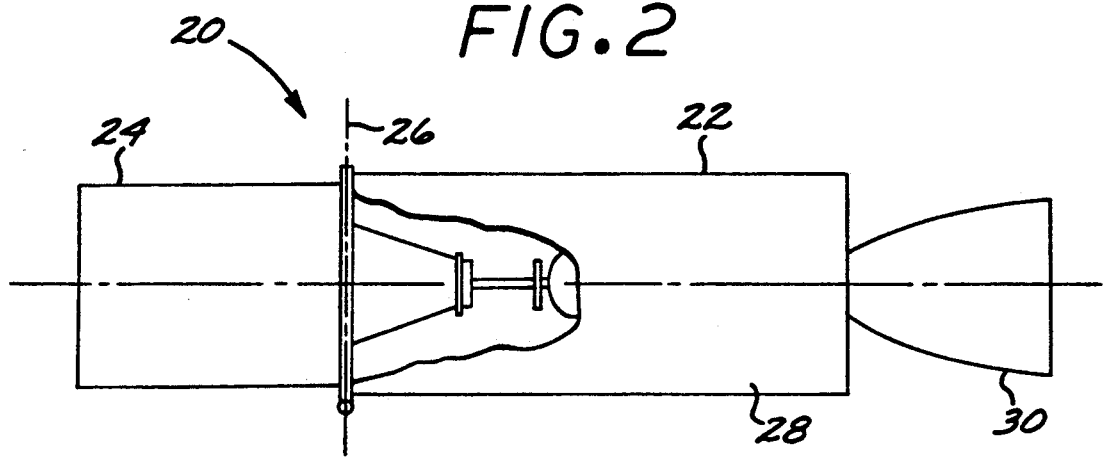
FIG. 2 is a schematic side view of the two space vehicles locked together prior to separation.

FIGS. 1 and 2 illustrate an interceptor space vehicle 20 which is the setting for the preferred embodiment and application of the present invention. (The use of the present invention is not so restricted, and may be used in other applications of stage separation.) The interceptor space vehicle 20 is formed of two separable vehicles, a launcher/booster 22 and a small space vehicle 24. The space vehicles 22 and 24 are initially joined together, but are controllably separable along a separation surface 26.

The launcher/booster 22 includes propellant tanks 28 and an axial booster thruster 30. Other thrusters 32 are used for station keeping and attitude control of the interceptor space vehicle 20. The small space vehicle 24 has a forward-facing sensor 34, propellant tanks 36, thrusters 38, and a guidance controller 40 that are used to direct the small space vehicle 24 toward a target.

In operation, the launcher/booster 22 and the small space vehicle 24 are initially locked together as the interceptor vehicle 20 by a mechanism to be described subsequently. The sensor 34 locates a target, and the controller 40 directs the firing of the axial booster thruster 30 and the thrusters 32 to direct the interceptor vehicle 20 toward that target. When the propellant in the tanks 28 becomes exhausted and the interceptor vehicle 20 nears the target, the launcher/booster 22 and the small space vehicle 24 are separated. The small space vehicle 24 then is directed by the sensor 34 and controller 40 to intercept the target by the operation of the thrusters 38. The target is destroyed by the impact of the small space vehicle 24 against the target.

Figure 3:
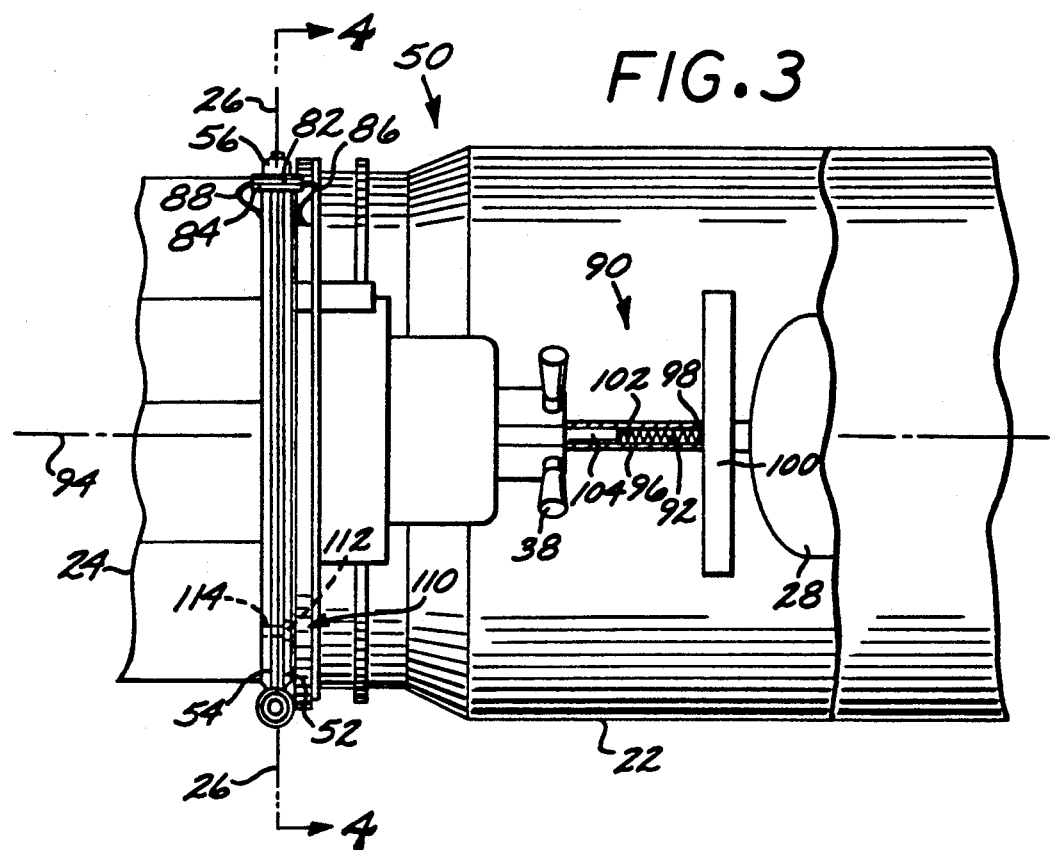
FIG. 3 is a detail of FIG. 2 at and adjacent the plane of separation.
Figure 4:
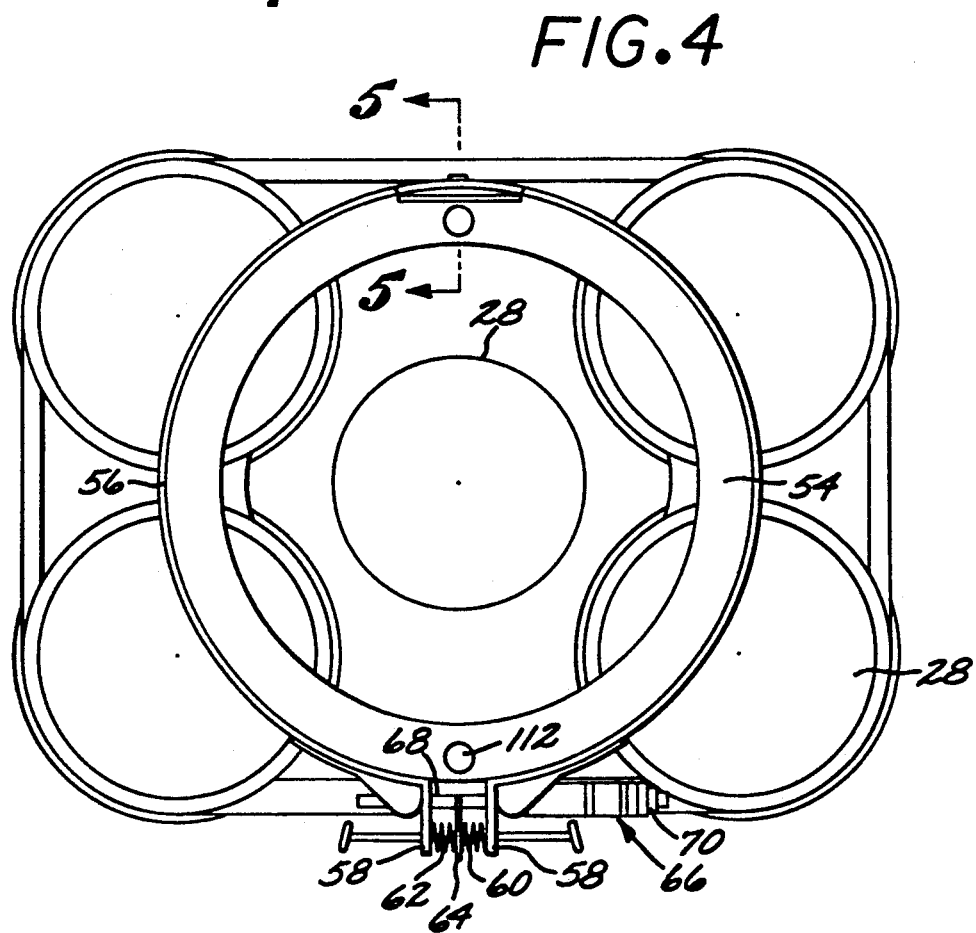
FIG. 4 is a schematic sectional view at the plane of separation prior to separation, taken generally along lines 4—4.
Figure 5:
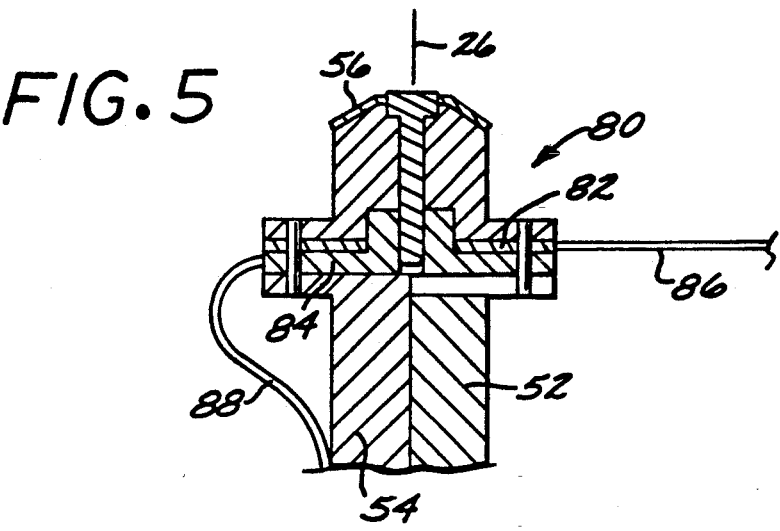
FIG. 5 is a schematic detail sectional view at the plane of separation illustrating the flange, clamp, and electrical interconnect prior to separation, taken generally along lines 5—5.

A locking and separating mechanism 50 is illustrated in more detail in FIGS. 3-5, in the initial state wherein the launcher/booster 22 and the small space vehicle 24 are locked together. The launcher/booster 22 has a forward-facing circumferentially extending flange 52, as seen in FIGS. 3 and 4. The small space vehicle 24 has a rearward-facing circumferentially extending flange 54, as seen in FIG. 3 in side view. The flanges 52 and 54 are shaped and dimensioned to meet in a facing engagement at the separation surface 26.

A circumferential clamp 56 captures the outer peripheries of the flanges 52 and 54 and mechanically locks the flanges 52 and 54 together in a releasable manner. The clamp 56 preferably is a V-band clamp sometimes known in the art as a "Marman" clamp. The clamp 56 extends around the circumference of the flanges 52 and 54 and terminates in two facing but separated ends 58. An optional clamp spring 60 may be placed between the ends 58 in compression, so as to tend to force the ends 58 apart. (Equivalently, the clamp spring could be configured in tension so as to pull the ends 58 apart.) The clamp spring 60 is fixed at its ends 62 to the ends 58 of the clamp 56, and fixed at its center 64 to the launcher/booster 22.

The clamp spring 60 tends to force the ends 58 apart, but prior to the initiation of separation the ends 58 are fixed in a closely facing relation by a disengagement actuator, in the preferred case a pyrotechnic bolt 66. The bolt 66 has a shaft 68 that extends between the ends 58 and holds them together, and a shaft cutter pyrotechnic device 70. Such pyrotechnic bolts 66 are readily available commercially. Alternatively, a pin puller, electromechanical device, hydraulic device, or other type of remotely actuated disengagement initiating device can be used to initiate the separation action.

Prior to the initiation of separation, there must be an electrical interconnect between the launcher/booster 22 and the small space vehicle 24, to allow the controller 40 to send commands to the thrusters 30 and 32 of the launcher/booster 22. A preferred electrical interconnect device 80 is constructed to permit radial engagement and disengagement. The electrical interconnect device 80 includes a launcher/booster 22 electrical interconnect 82 and a small space vehicle electrical interconnect 84. The interconnects 82 and 84 face each other radially. The small space vehicle electrical interconnect 84 is supported on the flange 54 of the small space vehicle 24. The launcher/booster electrical interconnect 82 is supported on the clamp 56. The interconnects 82 and 84 are preferably of the "fuzz button" type, wherein a mass of conducting fibers is placed between terminals on the interconnects 82 and 84. Wiring harnesses 86 and 88 extend from the interconnects 82 and 84, respectively.

A separator 90 that acts to force the small space vehicle 24 away from the launcher/booster 22 after the initiation of separation is provided on the launcher/booster 22. In the preferred form, the separator 90 includes a resilient means such as a spring 92 that is oriented parallel to a separation axis 94 and compressed between the launcher/booster 22 and the small space vehicle 24 prior to the initiation of separation, as shown in FIG. 4. The spring 92 is preferably, but not necessarily, located on the line between the centers of mass of the launcher/booster 22 and the small space vehicle 24, coincident with the separation axis 94. Locating the spring on the line between the centers of mass minimizes pitching of the two vehicles 22 and 24 during separation, but such pitching is in any event prevented by the guide to be discussed subsequently.

As illustrated, the spring 92 is enclosed within a housing 96 that constrains the spring 92 to expand along the separation axis 94, when released. A first end 98 of the spring 92 reacts against a base 100 on the launcher/booster 22 and a second end of the spring 102 reacts against a stinger pin 104 rearward extension of the small space vehicle 24. The stinger pin 104 extends into the interior of the housing 96 and acts as one of the guides during separation, to be discussed next.

A mechanical guide 110 is provided to locate the flanges 52 and 54 with respect to each other, and to guide the separation of the launcher/booster 22 and the small space vehicle 24. The mechanical guide 110 preferably includes three noncollinear pairs of guides and receptors that permit relative motion of the launcher/booster 22 and the small space vehicle 24 in a direction parallel to the separation axis 94 but not in any other direction or any other component of motion. A convenient approach to providing the mechanical guide 110 is pairs of pins and bores, one member of each pair being on the launcher/booster 22 and the other on the small space vehicle 24.

As discussed, one of the pairs is the stinger pin 104 and the other the spring housing 96. Each of the other two pairs is preferably provided as a pin 112 extending from the launcher/booster flange 52 into a bore 114 on the small space vehicle flange 56. One of the bores 114 may be slotted to prevent binding during separation.

The three noncollinear parts of pins and bores guide the stages in their separating movement as the spring 92 is extending. They serve to prevent any component of motion other than that parallel to the separation axis 94 to be introduced into the small space vehicle 24 during separation. The pins disengage from their respective bores after the spring motion stops. The pins and bores ensure near-perfect alignment of the two vehicles during separation, even though the spring force may not operate through the centers of gravity of the two vehicles. In their absence, other components of motion might be introduced that would tend to cause the small space vehicle 24 to pitch (which term is intended to cover pitch, yaw, and rotational components, as used herein). Such pitching could be overcome by control movements induced by the thrusters 38 of the small space vehicle 24, but that correction would require an expenditure of small space vehicle fuel. A pitching motion could also cause the sensor to lose alignment with the target, either permanently or temporarily until realignment could be completed.

Figure 6:
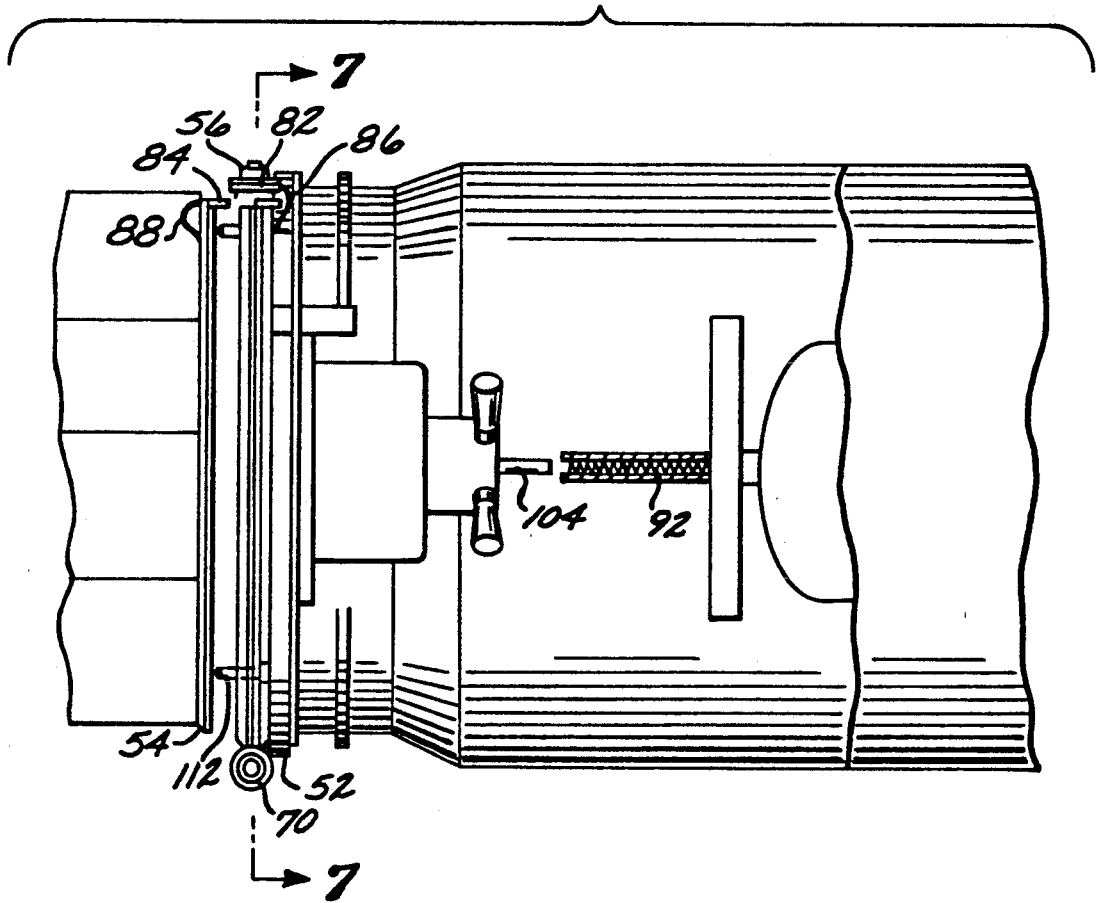
FIG. 6 is a schematic side view comparable to FIG. 3, except after the initiation of separation.
Figure 7:
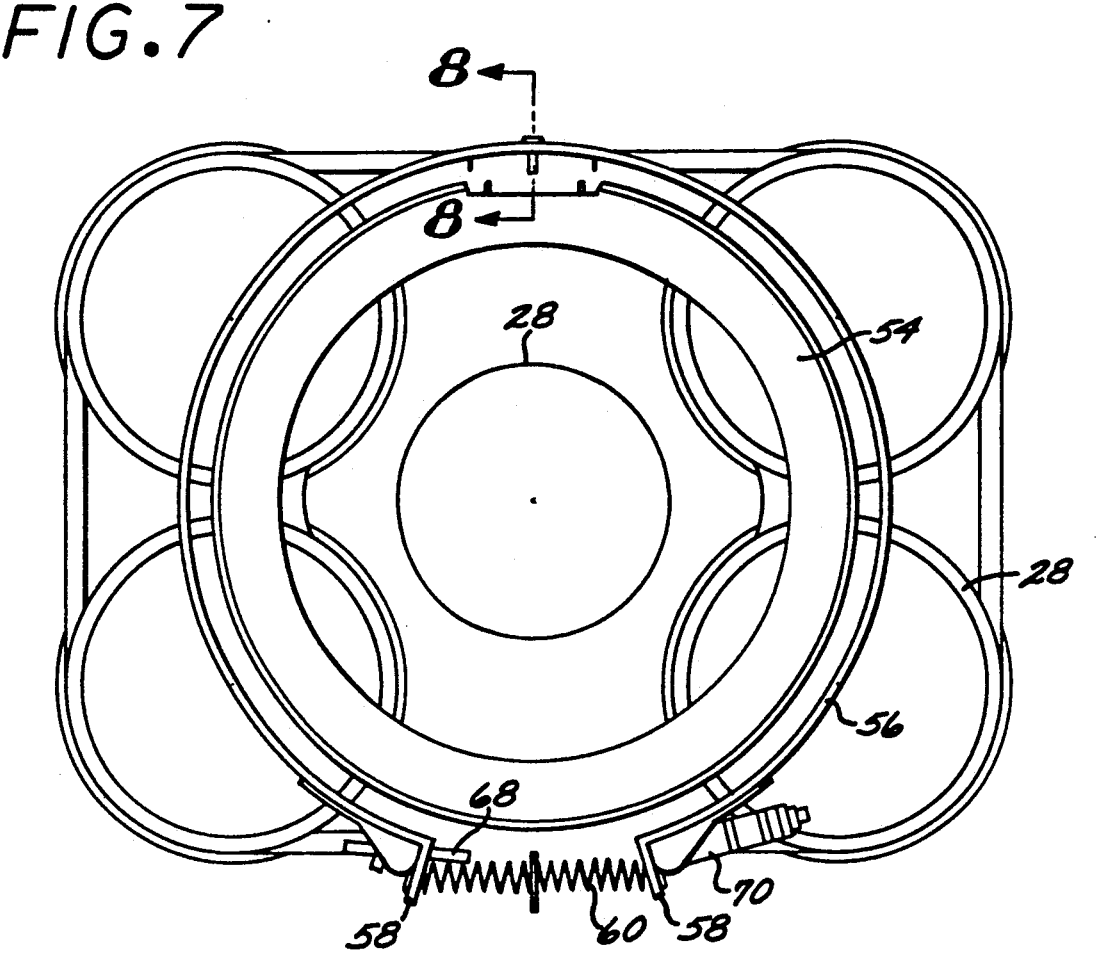
FIG. 7 is a schematic sectional view comparable to FIG. 4, taken along line 7—7, except after the initiation of separation.
Figure 8:
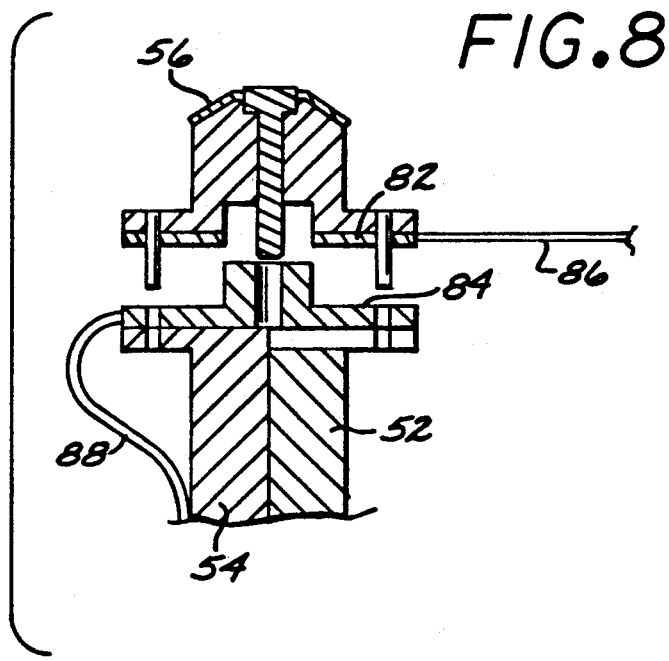
FIG. 8 is a schematic sectional view comparable to FIG. 5, taken along line 8—8, except after the initiation of separation.

FIGS. 6–8 are similar to the respective FIGS. 3–5, but illustrate the positions of the discussed elements just as the separation occurs. Separation is initiated by operating ("firing") the pyrotechnic disengagement device 70, thereby separating the shaft 68 of the pyrotechnic bolt 66, as shown in FIG. 7. The clamp ends 58 are therefore free to move apart under the influence of the clamp spring 60. Inasmuch as the center 64 of the clamp spring 60 is fixed, the clamp 56 enlarges as the ends 58 move apart, thereby releasing the flanges 52 and 54.

As the clamp 56 enlarges, the launcher/booster electrical interconnect 82 is lifted away from the small space vehicle electrical interconnect 84, FIG. 8. The electrical interconnection between the two vehicles 22 and 24 is therefore interrupted as the direct result of the operation of the locking and separating mechanism 50 and, more specifically, the firing of the pyrotechnic device 70. No separate electrical disengagement device or sequencing is required.

Also as the clamp 56 enlarges and the flanges 52 and 54 are released, the spring 92 is no longer restrained from expanding. The spring 92 therefore expands parallel to the separation axis 94, pushing the small space vehicle 24 away from the launcher/booster 22. Once again, no separate disengagement actuator is required, as the separating motion is initiated by the operation of the pyrotechnic device 70. The separating force is determined by the strength of the spring 92, but typically need not be large due to the absence of friction in the weightless environment.

As the small space vehicle 24 initially moves away from the launcher/booster 22, its motion is guided by the mechanical guide mechanism 110. The pin 104 and spring housing 96, and the two pins 112 and respective bores 114 prevent any component of motion other than that parallel to the pins and the separation axis 94. The small space vehicle 24 therefore moves smoothly away from the launcher/booster 22 along the separation axis 94.

The approach of the invention provides a stiff integral structure while the space vehicles are joined together, yet a clean, reliable separation upon command. The mechanical disconnect of the small space vehicle 24 from the launcher/booster 22, the electrical disconnect of the interconnects 82 and 84, and the initiation of the separator 90 all occur, and are initiated by, the operation of a single disengagement actuator, here the pyrotechnic device 70. This approach to separation is more reliable than prior approaches wherein separation was dependent upon the operation and proper sequencing of multiple pyrotechnic devices by electronic hardware. The separation is self-guided, requiring no separate guiding device. There is not gas or free-floating debris produced during separation that might damage the small space vehicle, and, more specifically, contaminate or impinge upon the sensor of the small space vehicle.

The operation of the approach of the invention was verified in 1 g (earth gravity) conditions. A simulated small space vehicle was joined by the separation mechanism of the invention to a simulated launcher/booster. The simulated small space vehicle was suspended from an overhead support and the simulated launcher/booster was fixed. In separate tests, two types of disengagement actuator techniques were used. In one, the disengagement was initiated with a pull key. In the other, the disengagement was initiated by cutting a bolt. A number of separations were performed, while monitoring the tip-off pitch (yaw) rate resulting from the separation. Both techniques successfully accomplished the separation at separation rates of at least 1 meter per second, with a single disengagement actuator. For the pull key initiation, yaw rates ranged from 1 to 12 milliradians per second. For the cut bolt initiation, yaw rates varied from 7 to 27 milliradians per second.

Although particular embodiments of the invention have been described in detail for purposes of illustration, various modifications may be made without departing from the spirit and scope of the invention. Accordingly, the invention is not to be limited except as by the appended claims.

What is claimed is:

1. A mechanism for locking a first-stage space vehicle and a second-stage space vehicle together, and for controllably releasing and separating the two vehicles along a preselected separation axis, comprising:

lock/release means for mechanically locking together and controllably releasing a first-stage space vehicle and a second-stage space vehicle;

spring means engaging said lock/release means for moving said lock/release means out of mechanical engagement with the two vehicles, allowing the vehicles to separate from one another along the preselected separation axis;

electrical interconnect means for maintaining electrical communication between the first-stage space vehicle and the second-stage space vehicle when the two space vehicles are locked together, and for controllably disconnecting the electrical communication when the two space vehicles are controllably released;

separator means for mechanically forcing the two space vehicles apart along the preselected separation axis; and guide means for mechanically guiding the two space vehicles as they separate, so that they separate along the separation axis while resisting other components of motion.

2. The mechanism of claim 1, wherein the lock/release means controllably releases the two space vehicles responsive to the operation of a single pyrotechnic device, the electrical interconnect means disconnects the electrical communication responsive to the operation of the same single pyrotechnic device, and the separator means for mechanically forcing separates the two space vehicles responsive to the operation of the same single pyrotechnic device.

3. A mechanism for locking a first-stage space vehicle and a second-stage space vehicle together, and for controllably releasing and separating the two vehicles along a separation axis, comprising:

lock/release means for mechanically locking and controllably releasing a first-stage space vehicle and a second-stage space vehicle, the lock/release means including a first circumferentially extending flange on the first-stage space vehicle, a second circumferentially extending flange on the second-stage space vehicle, a circumferential clamp that captures the first and second circumferentially extending flanges therein, the circumferential clamp having two facing but separated ends, a pyrotechnic device extending between the separated ends, and a clamp spring in compression extending between the facing but separated ends of the circumferential clamp, the clamp spring tending to force the separated ends apart;

electrical interconnect means for maintaining electrical communication between the first-stage space vehicle and the space vehicle and for controllably disconnecting the electrical communication responsive to the operation of the pyrotechnic device;

separator means for mechanically forcing the two space vehicles apart along a preselected separation axis responsive to the operation of the pyrotechnic device; and guide means for mechanically guiding the two space vehicles as they separate, so that they separate along the separation axis while resisting other components of motion.

4. The mechanism of claim 3, wherein the pyrotechnic device is a pyrotechnically severed bolt.

5. The mechanism of claim 3, wherein the separator means for mechanically forcing includes resilient separation means compressed between the first-stage space vehicle and the second-stage space vehicle when the lock/release means locks the two space vehicles together, and released to force the two space vehicles apart along the separation axis when the lock/release means is operated to release the two spacecraft.

6. The mechanism of claim 3, wherein the guide means for mechanically guiding includes at least three noncollinear pairs of guide and guide receptor, one member of each pair being on the first-stage space vehicle and the other member of each pair being on the second-stage space vehicle, each guide and guide receptor extending parallel to the preselected separation axis.

7. A mechanism for locking a first-stage space vehicle and a second-stage space vehicle together, and for controllably releasing and separating the two vehicles along a preselected separation axis, comprising:

lock/release means for mechanically locking together and controllably releasing a first-stage space vehicle and a second-stage space vehicle;

electrical interconnect means for maintaining electrical communication between the first-stage space vehicle and the space vehicle when the two space vehicles are locked together, and for controllably disconnecting the electrical communication when the two space vehicles are controllably released, the electrical interconnect means including a first electrical interconnect on the first-stage space vehicle, a second electrical interconnect on the second-stage space vehicle, the first and second electrical interconnects being in facing relationship along a radial axis perpendicular to a preselected separation axis, and means for causing the first and second electrical interconnects to separate along the radial axis upon operation of the lock/release means;

separator means for mechanically forcing the two space vehicles apart along the preselected separation axis; and guide means for mechanically guiding the two space vehicles as they separate, so that they separate along the separation axis while resisting other components of motion.

8. The mechanism of claim 7, wherein the lock/release means controllably releases the two space vehicles responsive to the operation of a single pyrotechnic device, the electrical interconnect means disconnects the electrical communication responsive to the operation of the same single pyrotechnic device, and the separator means for mechanically forcing separates the two space vehicles responsive to the operation of the same single pyrotechnic device.

9. The mechanism of claim 7, wherein the lock/release means includes a first circumferentially extending flange on the first-stage vehicle, a second circumferentially extending flange on the second-stage space vehicle, a circumferential clamp that captures the first and second circumferentially extending flanges therein, the circumferential clamp having two facing but separated ends, a clamp spring in compression extending between the facing but separated ends of the circumferential clamp, the clamp spring tending to force the separated ends apart, and a pyrotechnic device extending between the separated ends.

10. The mechanism of claim 7, wherein the separator means for mechanically forcing includes resilient separation means compressed between the first-stage space vehicle and the second-stage space vehicle when the lock/release means locks the two space vehicles together, and released to force the two space vehicles apart along the separation axis when the lock/release means is operated to release the two spacecraft.

11. The mechanism of claim 7, wherein the guide means for mechanically guiding includes at least three noncollinear pairs of guide and guide receptor, one member of each pair being on the first-stage space vehicle and the other member of each pair being on the second-stage space vehicle, each guide and guide receptor extending parallel to the preselected separation axis.

12. A mechanism for locking a first-stage space vehicle and a second-stage space vehicle together, and for controllably releasing and separating the two vehicles along a preselected separation axis, comprising:

lock/release means for mechanically locking together and controllably releasing a first-stage space vehicle and a second-stage space vehicle;

electrical interconnect means for maintaining electrical communication between the first-stage space vehicle and the space vehicle when the two space vehicles are locked together, and for controllably disconnecting the electrical communication when the two space vehicles are controllably released;

separator means for mechanically forcing the two space vehicles apart along a preselected separation axis; and guide means for mechanically guiding the two space vehicles as they separate, so that they separate along the separation axis while resisting other components of motion, the guide means for mechanically guiding including at least three noncollinear pairs of guide and guide receptor, one member of each pair being on the first-stage space vehicle and the other member of each pair being on the second-stage space vehicle, each guide and guide receptor extending parallel to the preselected separation axis.

13. The mechanism of claim 12, wherein the lock/release means controllably releases the two space vehicles responsive to the operation of a single pyrotechnic device, the electrical interconnect means disconnects the electrical communication responsive to the operation of the same single pyrotechnic device, and the means for mechanically forcing separates the two space vehicles responsive to the operation of the same single pyrotechnic device.

14. A mechanism for locking a first-stage space vehicle and a second-stage space vehicle together, and for controllably releasing and separating the two vehicles along a separation axis, comprising:

lock/release means for mechanically locking and controllably releasing a first-stage space vehicle and a second-stage space vehicle, the lock/release means including a first circumferentially extending flange on the first-stage space vehicle, a second circumferentially extending flange on the second-stage space vehicle, a circumferential clamp that captures the first and second circumferentially extending flanges therein, the circumferential clamp having two facing but separated ends, a clamp spring in compression extending between the facing but separated ends of the circumferential clamp, the clamp spring tending to force the separated ends apart, and a pyrotechnic device extending between the separated ends;

electrical interconnect means for maintaining electrical communication between the first-stage space vehicle and the space vehicle when the two space vehicles are locked together, and for controllably disconnecting the electrical communication when the two space vehicles are controllably released, the electrical interconnect means including a first electrical interconnect on the first-stage space vehicle, a second electrical interconnect on the second-stage space vehicle, the first and second electrical interconnects being in facing relationship along a radical axis perpendicular to a preselected separation axis, and means for causing the first and second electrical interconnects to separate along the radial axis upon operation of the lock/release means;

separator means for mechanically forcing the two space vehicles apart along a preselected separation axis, the separator means for mechanically forcing including resilient separation means compressed between the first-stage space vehicle and the second-stage space vehicle when the lock/release means locks the two space vehicles together, and released to force the two space vehicles apart along the separation axis when the lock/release means is operated to release the two spacecraft; and guide means for mechanically guiding the two space vehicles as they separate, so that they separate along the separation axis while resisting other components of motion, the guide means for mechanically guiding including at least three noncollinear pairs of guide and guide receptor, one member of each pair being on the first-stage space vehicle and the other member of each pair being on the second-stage space vehicle, each guide and guide receptor extending parallel to the preselected separation axis.

* * * * *